United States Patent
Kohl et al.

(10) Patent No.: US 10,780,762 B2
(45) Date of Patent: Sep. 22, 2020

(54) ELECTRICAL HEATING DEVICE

(71) Applicant: Türk & Hillinger Automotive GmbH, Tuttlingen (DE)

(72) Inventors: Michael Kohl, Bietigheim-Bissingen (DE); Karl-Gerd Krumbach, Burgstetten (DE); Wolfgang Seewald, Tamm (DE); Igor Tschemeris, Kornwestheim (DE); Christoph Fodor, Muehlheim (DE); Andreas Schlipf, Tuttlingen (DE)

(73) Assignee: Türk & Hillinger Automotive GmbH, Tuttlingen (DE)

( * ) Notice: Subject to any disclaimer, the term of this patent is extended or adjusted under 35 U.S.C. 154(b) by 232 days.

(21) Appl. No.: 15/971,137

(22) Filed: May 4, 2018

(65) Prior Publication Data
US 2018/0319252 A1 Nov. 8, 2018

(30) Foreign Application Priority Data
May 8, 2017 (DE) .......................... 10 2017 207 738

(51) Int. Cl.
*B60H 1/22* (2006.01)
*H05B 3/50* (2006.01)
(Continued)

(52) U.S. Cl.
CPC ......... *B60H 1/2221* (2013.01); *B60H 1/2218* (2013.01); *F24H 1/009* (2013.01);
(Continued)

(58) Field of Classification Search
None
See application file for complete search history.

(56) References Cited

U.S. PATENT DOCUMENTS 1,345,222 A * 6/1920 Nobbs ....................... H05B 3/00
392/489
1,417,315 A * 5/1922 Graff ....................... F24H 1/102
392/489
(Continued)

FOREIGN PATENT DOCUMENTS

DE 3026545 A1 2/1982
DE 3403359 A1 8/1985
(Continued)

OTHER PUBLICATIONS

Search Report dated Apr. 17, 2018 in DE 10 2017 207 738.7.

*Primary Examiner* — Thor S Campbell
(74) *Attorney, Agent, or Firm* — Panitch Schwarze Belisario & Nadel LLP

(57) ABSTRACT

An electrical heating device (1) includes a housing (2, 102) having a fluid inlet (3) for the intake of a fluid to be heated into the housing (2, 102) and having a fluid outlet (4) for the discharge of the fluid from the housing (2, 102). A flow channel (5) for the fluid is formed between the fluid inlet (3) and fluid outlet (4), and at least one heating instrument (6, 105, 205) extends into the flow channel (5) in the housing (2, 102). This heating instrument has a sleeve (7, 207) that surrounds an interior of the heating instrument (6, 105, 205) in a fluid-tight way. At least one heating element (8, 208) is arranged in the sleeve (7, 207), and at least one sensor element (9, 109, 209) is arranged in the sleeve (7, 207) for monitoring the temperature of the at least one heating element (8, 208).

21 Claims, 7 Drawing Sheets

(51) Int. Cl.
*F24H 9/18* (2006.01)
*F24H 1/10* (2006.01)
*F24H 1/00* (2006.01)
*H05B 1/02* (2006.01)
*B60H 1/00* (2006.01)

(52) U.S. Cl.
CPC ........... *F24H 1/102* (2013.01); *F24H 9/1827* (2013.01); *H05B 1/0297* (2013.01); *H05B 3/50* (2013.01); *B60H 1/00385* (2013.01); *B60H 2001/2231* (2013.01); *B60H 2001/2271* (2013.01); *F24H 2250/04* (2013.01); *H05B 2203/014* (2013.01); *H05B 2203/02* (2013.01); *H05B 2203/023* (2013.01)

(56) References Cited

U.S. PATENT DOCUMENTS

| | | | | |
|---|---|---|---|---|
| 1,671,677 A | * | 5/1928 | Keeton | F24H 1/142 392/489 |
| 1,754,580 A | * | 4/1930 | Staley | F24H 1/103 392/488 |
| 1,805,885 A | * | 5/1931 | Rinderspacher | F24H 1/121 392/493 |
| 1,825,793 A | * | 10/1931 | Herbert | F24H 1/102 392/492 |
| 2,673,919 A | * | 3/1954 | Arvins | F24H 1/162 392/495 |
| 2,866,884 A | * | 12/1958 | Minier | B05B 1/24 392/489 |
| 2,866,885 A | * | 12/1958 | McIlrath | F24H 1/162 392/481 |
| 3,110,296 A | * | 11/1963 | Lundi | F02M 1/00 123/557 |
| 3,544,236 A | * | 12/1970 | Brookmire | G05D 23/1906 417/32 |
| 3,888,412 A | * | 6/1975 | Lindo | B60S 1/487 237/12.3 B |
| 4,044,742 A | * | 8/1977 | Linder | F01P 3/20 123/549 |
| 4,180,896 A | * | 1/1980 | Reed | A61M 1/32 29/428 |
| 4,208,570 A | * | 6/1980 | Rynard | F02N 19/10 123/142.5 E |
| 4,358,667 A | * | 11/1982 | Johnson | H05B 3/82 219/508 |
| 4,397,288 A | * | 8/1983 | Kelling | F02M 31/16 123/557 |
| 4,465,922 A | * | 8/1984 | Kolibas | F24H 1/121 165/156 |
| 4,808,793 A | * | 2/1989 | Hurko | F24H 1/102 392/480 |
| 4,862,951 A | * | 9/1989 | Muller | B60S 1/487 165/41 |
| 5,183,099 A | * | 2/1993 | Bechu | B60S 1/487 165/169 |
| 6,080,973 A | | 6/2000 | Thweatt, Jr. | F24H 9/0047 219/497 |
| 6,637,378 B1 | * | 10/2003 | Al-Amin | B60H 1/22 122/28 |
| 7,286,752 B2 | * | 10/2007 | Gourand | F24H 1/142 392/479 |
| 7,313,322 B2 | * | 12/2007 | Starck | B60S 1/488 392/441 |
| 9,167,629 B2 | * | 10/2015 | Obst | B60H 1/2221 |
| 9,651,276 B2 | * | 5/2017 | Ramirez | F24H 1/0018 |
| 2010/0282090 A1 | * | 11/2010 | Etter | A47J 31/542 99/288 |
| 2012/0315024 A1 | | 12/2012 | Obst et al. | |
| 2013/0055902 A1 | * | 3/2013 | Berto | A47J 31/542 99/281 |
| 2017/0071030 A1 | | 3/2017 | Schlipf | |

FOREIGN PATENT DOCUMENTS

| | | |
|---|---|---|
| DE | 19716010 C1 | 10/1998 |
| DE | 60118378 T2 | 12/2006 |
| DE | 102010060446 A1 | 5/2011 |
| DE | 102015114886 A1 | 3/2017 |
| DE | 102016116382 A1 | 3/2017 |
| EP | 0204850 A1 | 12/1986 |
| EP | 1872986 A1 | 1/2008 |
| EP | 2440004 A1 | 4/2012 |
| EP | 2637475 A1 | 9/2013 |

\* cited by examiner

ELECTRICAL HEATING DEVICE

CROSS-REFERENCE TO RELATED APPLICATIONS

This application claims priority under 35 U.S.C. § 119(b) to German Application No. 10 2017 207 738.7, filed May 8, 2017, the disclosure of which is incorporated herein by reference in its entirety.

BACKGROUND OF THE INVENTION

The invention relates to an electrical heating device, in particular, for heating an interior of a motor vehicle.

Motor vehicles typically have a heatable vehicle interior. To heat this interior, motor vehicles with internal combustion engines typically have a heating system with a heat exchanger that carries a flow of hot coolant that is heated by the internal combustion engine. The coolant is here used primarily to cool the internal combustion engine. The waste heat of the internal combustion engine is transferred to the coolant and is used in the heat exchanger of the heating system for heating the vehicle interior. In this way, the air flowing through the heat exchanger of the heating system is heated and fed to the vehicle interior.

In particular, motor vehicles with low fuel-consumption internal combustion engines that generate little waste heat and motor vehicles with plug-in/range extender systems require auxiliary heating devices for heating the interior. Motor vehicles with electric drives require heating devices, because heating by means of coolant heated by the internal combustion engine is not available in these motor vehicles, because they do not have an internal combustion engine.

Here, heating or auxiliary heating is desired or required primarily in the start-up phase and/or when the outside temperature is low.

For this purpose, various heating devices or auxiliary heating devices have become known, such as, for example, auxiliary electrical heating devices, heat pump devices, fuel heaters, and auxiliary heating by means of exhaust-gas heat exchangers.

The designations "heating" and "auxiliary heating" and the designations "heater" and "auxiliary heater" are used synonymously below in the sense of the present invention.

The auxiliary electrical heating has the advantage that the required electrical heating devices are economical relative to other solutions and the generated heat is noticeable relatively spontaneously, because the electrical power is converted virtually immediately into noticeable heat. Furthermore, electrical heating devices can be installed in a space-saving and flexible manner and thus in a motor vehicle.

For hybrid vehicles or vehicles driven only by electricity, the value of the electrical heating system or auxiliary heating system is even greater, because heating by means of waste heat from an internal combustion engine is not possible. Such motor vehicles require an electrical power that is greater than approximately 3 kW. This also means that a high power density is advantageous. In such motor vehicles, the electric system voltage is usually greater than 60 V, sometimes even over 300 V. Due to the high required heating power on the (auxiliary) heater, this electrical heating device is also operated with the high voltage in order to keep the current intensity occurring during operation as low as possible.

A heater or auxiliary heater constructed as a heating device for high-voltage applications, that is, for voltages greater than 60 V, must be constructed so that the heating device does not present any danger during operation or during service.

In electrical heating devices constructed as auxiliary heaters or as standalone heaters, there is the ability to transfer the electrical power directly into a fluid medium, for example, a coolant, which outputs the heat via another heat exchanger into the interior of the vehicle. Such a heating device is also called a coolant-based heating device.

There is also the possibility for the electrical power to be discharged to air and this heated air is used for heating the interior. Such a heating device is also called an air-based heating device.

Air-based heating devices are more instantaneous, because the electrical energy is converted nearly one hundred percent into heating the air. The efficiency is nearly one hundred percent. However, it can be used appropriately only for heating the interior of the vehicle cabin. Likewise, it is appropriately integrated in the vehicle interior, that is, in the climate-control unit. The integration of a high-voltage component in the interior, however, is complicated in terms of safety and usually means a more complicated construction of the climate-control unit, which increases costs.

The coolant-based heating device is not very spontaneous and efficient in its heating effect, because the electrical energy is first used to heat up the fluid, for example, in a small water circuit. In a separate coolant/air heat exchanger, like in a motor vehicle with an internal combustion engine, the heated fluid or water is used to heat the air flowing into the vehicle interior.

Preferably, there are no high-voltage components in the interior of the motor vehicle. For this configuration, it is also advantageous that the coolant-based heating device can be mounted in the motor vehicle at different positions outside of the vehicle interior. The climate-control unit can be used like in a conventional motor vehicle, without the need for large structural changes. Another advantage of the coolant-based heating device is the ability to be able to heat or warm a battery, for example, in a pure electric vehicle, by means of the warm water or the coolant.

In the prior art, various coolant-based heating devices have become known. DE 10 2010 060 446 A1 discloses a resistance heating device with a coil-shaped heating coil in a housing with a coolant flow. In this heating coil there is a heating wire that is, in turn, coil-shaped. The voltage drop or the current flow is realized along this coil-shaped, wound heating wire. The construction, however, is very complicated and thus also expensive to manufacture.

Heating devices with PTC (positive temperature coefficient) heating elements are also known, which are energized by means of contact electrodes; see EP 1 872 986 A1. The heating elements output their heat only indirectly to the coolant, because the heating unit consisting of heating elements and contact electrodes is electrically insulated. The heat must be transferred at least through the electrical insulation made from materials with poor thermal conductance properties and through the housing of the coolant-guiding channels, in order to heat the coolant. The housing is a rather massive cast body that has U-shaped recesses that extend into the fluid chambers. The coolant then flows in a meander-like course around the U-shaped recesses. In these fluid chambers are the heating elements that are insulated on both sides. The heating unit consisting of PTC heating elements and contact electrodes is then pressed with a clamping wedge made from aluminum into the U-shaped recesses. This pressing creates the electrical contacting between the PTC heating elements and contact electrodes and the thermal contacting between the heating unit and U-shaped recess. Such heating devices have also become known through EP 2 637 475 A1 and EP 2 440 004 B1.

The heating devices according to the prior art also have disadvantages.

Coolant-based resistance heaters are not intrinsically safe with respect to temperature overheating of the heating unit. Therefore, temperature monitoring and corresponding cut-off devices are required, for example, for a sudden stoppage of the coolant volumetric flow.

Coolant-based PTC heating devices typically have a large number of heating units that consist of 2 contact electrodes and PTC heating elements and insulation. This results in rather high installation costs. The cast housing produces heavy and large constructions.

In contrast to PTC heating devices, resistance heating devices cannot regulate themselves or only with many restrictions. A very limited self-regulation can be achieved by the use of a heating wire that has PTC resistance characteristics. Nevertheless, if the lack of sufficient cooling cannot be prevented, the heating wire or the heat exchanger can still overheat.

DE 10 2010 0660 446 A1 discloses a resistance heating device that has three adjacent heating stages as heating-wire windings that have PTC resistance characteristics. Due to the change in resistance due to the change in temperature, it can be determined if coolant is present and if there is a sufficient flow rate of the coolant to be heated. A disadvantage here is that due to the three stages, a total of six passages into the connection plate is required. More passages and heating coils require more electrical connecting locations that must be connected. This leads to an increased chance of potential sources of error and an increased number of soldering positions that represent a potential risk for leaks in the heating device. Because each heating stage is made from multiple windings, there is the risk of local overheating being produced, without this overheating being detected. This could then be the case, for example, if only the first winding of the first heating stage is located outside of the coolant in a vertical installation condition. This first winding can be excessively heated accordingly without causing a sufficient change in resistance, because the majority of the heating stage is still wetted by coolant. Such situations can occur, for example, due to a creeping coolant loss or due to a coolant pump failure.

Furthermore, there are arrangements and orientations of the heating device that can lead to situations in connection with low flow rates of the coolant in which large stationary or pulsating vapor bubbles can be formed. Such situations can be produced, for example, when driving up long, steep inclines.

BRIEF SUMMARY OF THE INVENTION

The object of the invention is to create an electrical heating device that can be produced easily and economically relative to the prior art and is nevertheless improved with respect to the prior art.

The object is achieved by an electrical heating device comprising a housing having a fluid inlet for intake into the housing of a fluid to be heated and having a fluid outlet for discharge of the fluid from the housing, a flow channel for flow of the fluid between the fluid inlet and the fluid outlet, at least one heating instrument extending into the flow channel in the housing, the heating instrument having a sleeve that surrounds an interior of the heating instrument in a fluid-tight way, at least one heating element in the sleeve, and at least one sensor element in the sleeve for monitoring temperature of the at least one heating element.

One embodiment of the invention relates to an electrical heating device with a housing with a fluid inlet for the intake of a fluid to be heated into the housing and with a fluid outlet for the discharge of the fluid to be heated from the housing, wherein a flow channel for the fluid is formed between the fluid inlet and fluid outlet, wherein at least one heating instrument extends into the flow channel in the housing, said heating instrument having a sleeve that surrounds an interior of the heating instrument in a fluid-tight way, wherein there is at least one heating element in the sleeve, wherein there is at least one sensor element in the sleeve for monitoring the temperature of the at least one heating element. In this way, a safe use of the heating device is possible, because the at least one sensor element detects the respective operating state and the device can be switched off in the event of overheating.

The fluid to be heated is preferably a water-based cooling fluid, optionally with additives as it is likewise used, for example, for internal combustion engines. The fluid to be heated can also be a different fluid, for example, an oil-based fluid.

The electrical supply to the heating device is advantageously realized with a low voltage of up to approximately 60 V, for example, 12 V or 24 V. Alternatively, the supply voltage could be a high voltage, for example, in the range of 200 V to 400 V or more.

It is especially advantageous if a plurality of heating instruments extends into the flow channel in the housing. In this way, the heating instruments can be arranged parallel to each other or in a cascaded serial arrangement, so that the fluid to be heated is heated by the heating instruments one after the other.

It is also advantageous if the sleeve of the heating instrument has a tubular construction and extends from the housing at its two end areas.

Here, the sleeve of the heating instrument is preferably made from a metal, such as aluminum or an aluminum alloy, so that it has a stable and robust construction. The sleeve can also be made from metal so that the sleeve can be soldered to the housing in order to achieve a tight connection.

It is also advantageous if the housing has an essentially block-shaped construction with a longitudinal extent along a longitudinal side, wherein the sleeve of the heating instrument extends from the housing with its end areas on a longitudinal-side end of the housing. In this way it can be achieved that the sleeve has an approximately U-shaped profile in the housing, with some windings, meander-shaped guides, etc. The connections of the heating elements and/or the sensor elements, however, are on one side of the housing.

Likewise, it is also advantageous if the housing has an essentially block-shaped construction with a longitudinal extent along a longitudinal side, wherein the sleeve of the heating agent extends from the housing with its end areas on opposite longitudinal-side ends of the housing. In this way it is achieved that the sleeve of the heating instrument or the heating instrument extends approximately along essentially the entire extent of the heating device or the housing. This arrangement produces a good ability to heat the fluid to be heated.

In another embodiment it is also advantageous if the housing has a multiple-part construction with a trough-shaped element and a cover element, wherein the end areas of the sleeve are guided through openings of the cover element, which are sealed in the area of the feed-through of the sleeve. In this way, such a multiple-part design produces advantages in production and installation. The parts can be better produced individually and the connection of the heating instrument to the housing is simplified.

It is also preferred if a control unit is placed on the cover element, wherein this control unit is connected electrically to the at least one heating element and the at least one sensor element extending from the end areas of the sleeve. In this way, an integrated heating device is achieved that can be installed as a compact unit in a motor vehicle.

Thus, in another embodiment it is advantageous if the control unit is enclosed by a closing cover that is connected to the cover element in a sealed way. In this way, the electronics of the control unit are safely stored and connected to the housing as a structural unit.

Alternatively, it is also advantageous if a heating element or multiple heating elements are provided in a sleeve of a heating instrument and a sensor element or multiple sensor elements are provided in the sleeve of the heating instrument. In this way, the heating power can be increased and simultaneously the heating output can be better distributed. The monitoring can also be improved with multiple sensor elements. In this way, for example, different sections can be monitored separately.

It is also advantageous if the heating element is a heating wire that has resistance characteristics or PTC resistance characteristics. In this way, the heating element can be formed relatively simply as a resistive element.

It is also advantageous if the heating element is a heating wire that is sheathed by a heating element sleeve. In this way, the heating element is better protected.

It is also advantageous that the sensor element is a wire element that has PTC resistance characteristics. In this way, a favorable and simple monitoring can be achieved if the resistance of the sensor element increases greatly for an increasing temperature of the heating instrument.

Here it is especially advantageous if the sensor element is a wire element that is sheathed by a sensor element sleeve. In this way, the sensor element can also be better protected, for example, against mechanical stress.

It is especially advantageous if a sensor element has two sensor element ends that both emerge from the sleeve of the heating instrument either at the same end area of the sleeve of a heating instrument or which each emerge from the sleeve of the heating instrument at different end areas of the sleeve of a heating instrument. In this way, a favorable arrangement can be provided for monitoring the heating instrument.

It is advantageous if a sensor element whose sensor element ends emerge from the sleeve of the heating instrument at the same end area of the sleeve of a heating instrument has a U-shaped profile in the sleeve of the heating instrument. In this way, the range of the sensor elements into the sleeve of the heating instrument can be defined.

It is also advantageous if a sensor element extends only partially or completely with a U-shaped profile in the longitudinal extent of the sleeve of the heating instrument into the sleeve of the heating instrument.

Furthermore, it is advantageous if, for at least one heating instrument, multiple sensor elements are provided each of which extend a different distance into the sleeve of the heating instrument and/or extend into the heating instrument from different end areas of the sleeve of the heating instrument. In this way, multiple sensor elements can be provided that extend into the sleeve from one side or also extend into the sleeve from different sides. Thus, different areas of the heating instrument can be monitored independently.

It is also especially advantageous if a heating instrument has a coil-shaped or meander-shaped construction. In this way, the released heating energy can be transferred to the fluid to be heated in a better way.

It is also advantageous if a heating instrument is in a plane. In this way, a flat construction can be achieved. Also, multiple such flat heating instruments could be arranged at a distance from each other, that is, in a layered arrangement.

It is likewise advantageous if a heating instrument has a round or a flat cross section and/or if the sleeve of the heating instrument has a flat tube or round tube construction. In this way, a suitable geometry can be selected as a function of the arrangement of the heating elements and/or the sensor elements.

It is also advantageous if the heating elements and/or the sensor elements are provided on each of their ends with crimped wires and/or pins as connection elements with a larger cross section and/or with a higher electrical conductance. In this way, the connection of the heating elements or the sensor elements can be selected free from thermal effects. This prevents distortion of the monitoring.

Thus, it is also advantageous if the transition from the heating element or from the sensor element to the connection element is realized in the sleeve of the heating instrument. In this way, the transition to the connection element is better protected.

It is also advantageous if the transition in the sleeve of the heating instrument is realized at the height of the cover element of the housing. In this way, the heated or the monitored area is limited to the interior of the housing.

Furthermore, it is preferred if elements, such as, in particular, wires that have different resistances at room temperature and/or different cross section and/or different coil diameter are used as the heating and/or sensor elements.

Other advantageous constructions are described by the following description of the figures and by the dependent claims.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
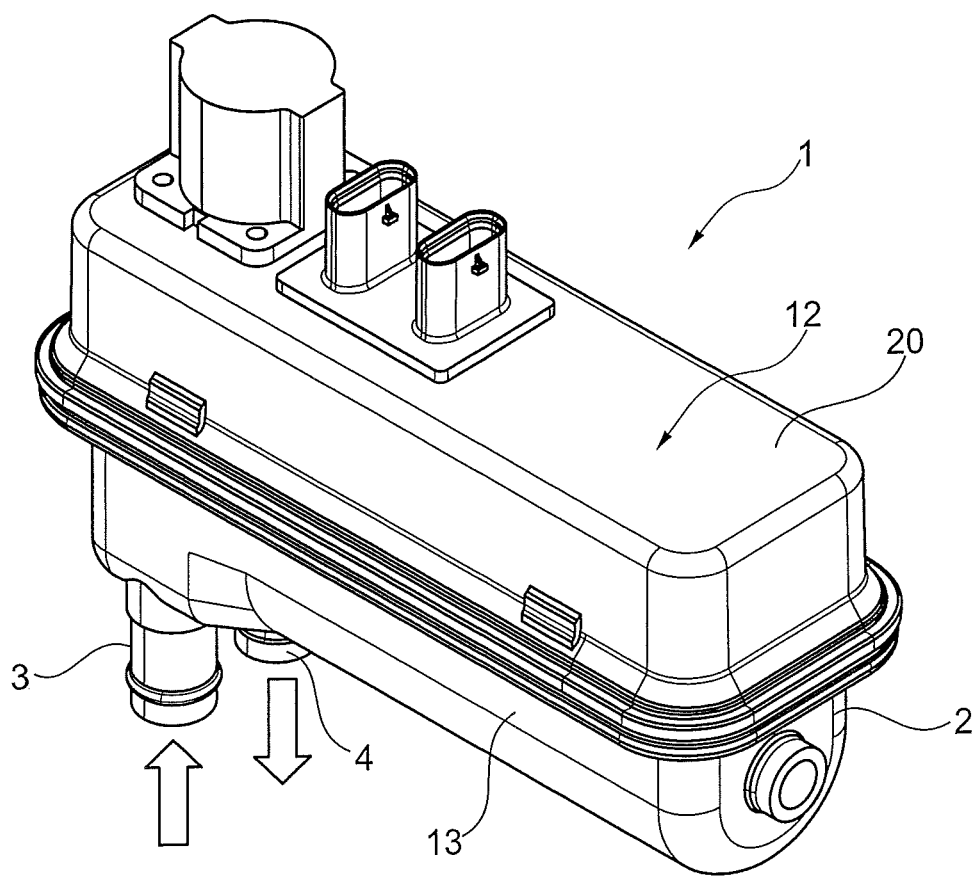
FIG. 1 is a perspective representation of an embodiment of an electrical heating device according to the invention.
Figure 2:
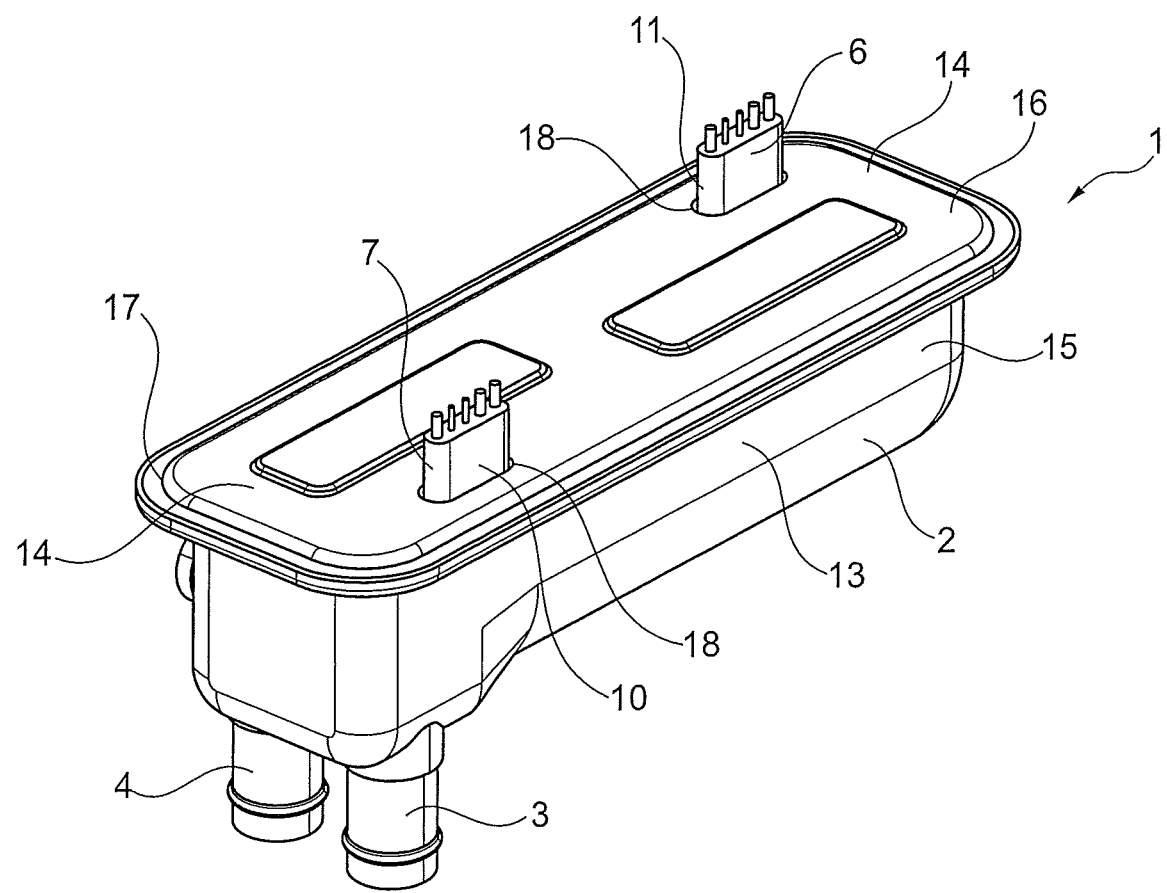
FIG. 2 is a perspective partial representation of an embodiment of an electrical heating device according to the invention.
Figure 3:
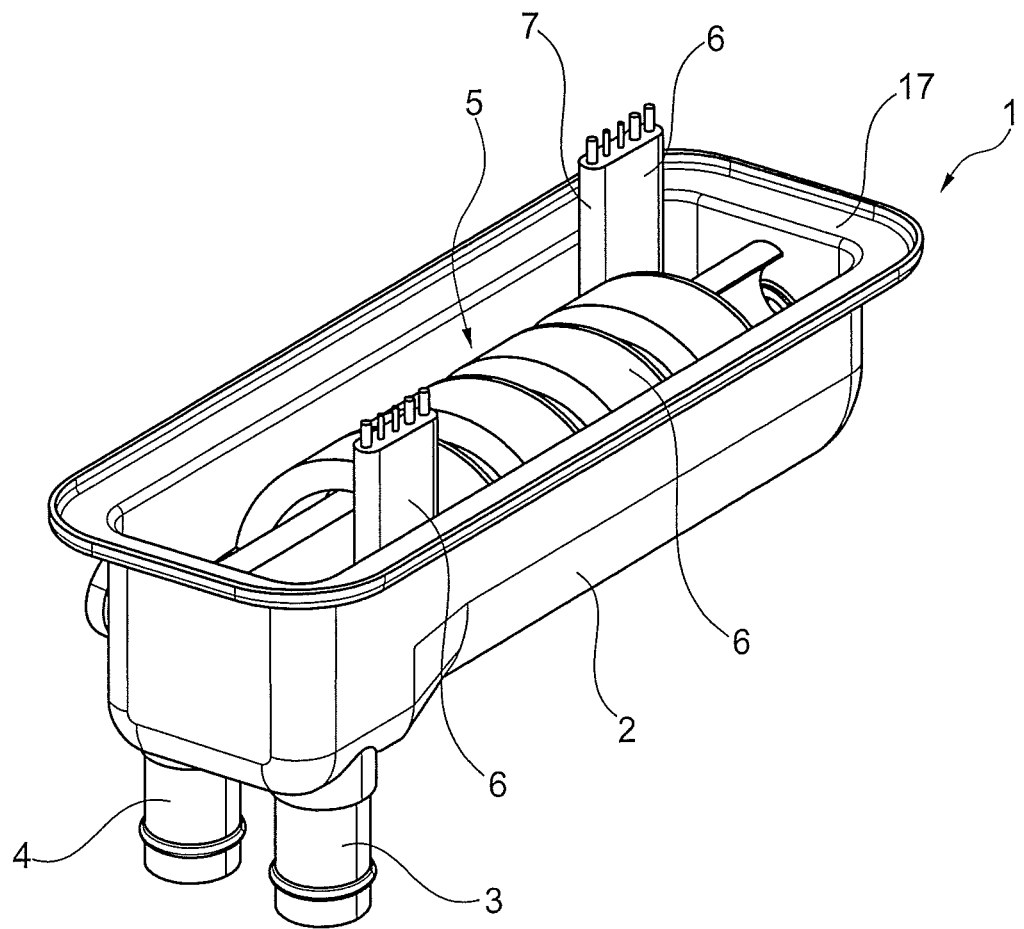
FIG. 3 is a perspective partial representation of an embodiment of an electrical heating device according to the invention.
Figure 4:
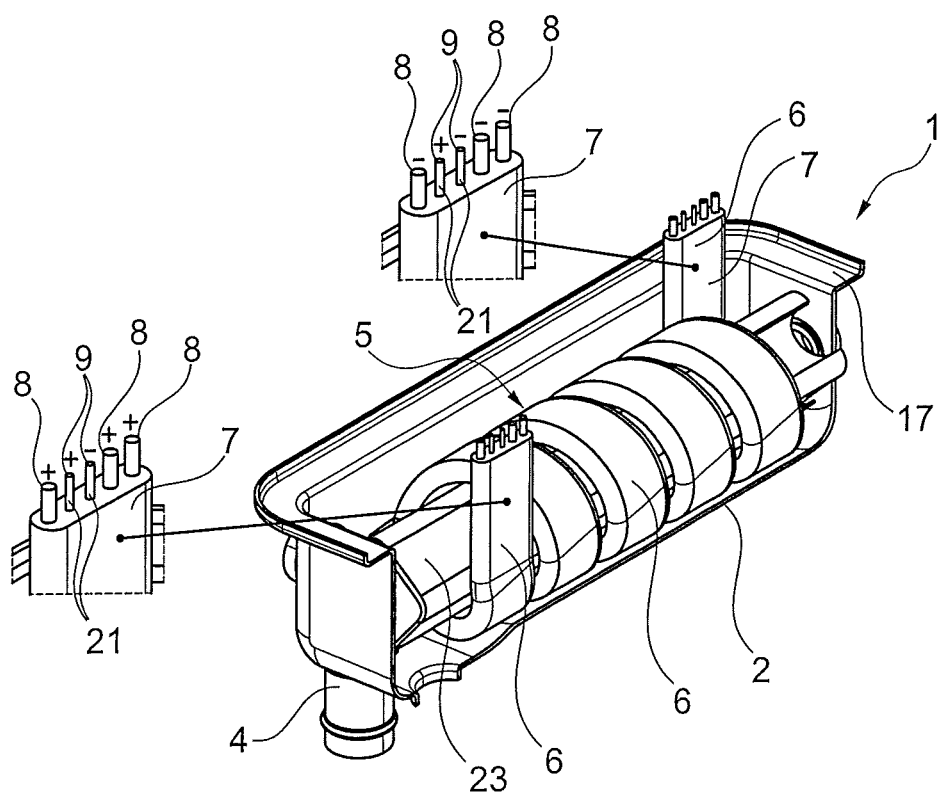
FIG. 4 is a perspective partial representation of an embodiment of an electrical heating device according to the invention.

FIGS. 1 to 8 show a first embodiment of an electrical heating device 1.

The heating device 1 has a housing 2 that is formed with a fluid inlet 3 for the intake of a fluid to be heated into the housing 2 and with a fluid outlet 4 for the discharge of the fluid to be heated from the housing 2.

A flow channel 5 is formed between the fluid inlet 3 and the fluid outlet 4. The fluid to be heated flows through this channel in order to be heated.

At least one heating instrument 6 extends into the housing 2 and into the flow channel 5 in the housing 2. Advantageously, a heating instrument 6 can be provided or also multiple heating instruments 6 can be provided.

Each heating instrument 6 has a sleeve 7 that is preferably made from metal. Alternatively, however, the sleeve 7 could also be made from plastic or a similar material. The sleeve 7 of the heating instrument 6 surrounds an interior of the heating instrument 6 in a fluid-tight way, wherein there is at least one heating element 8 in the sleeve 7. Furthermore, there is at least one sensor element 9 in the sleeve 7 of the heating instrument 6 for monitoring the temperature of the at least one heating element 8.

In FIGS. 1 to 8, only one, in particular, a coil-shaped heating instrument 6 is provided. Here, alternatively, a plurality of heating instruments 6 could also be provided, which extend into the flow channel 5. In this way, better distribution of the heating energy and higher heating power can be achieved.

In FIGS. 1 to 8 it can be seen that the sleeve 7 of the heating instrument 6 has a tubular construction and extends from the housing 2 at its two end areas 10, 11. There, the heating instrument 6 is connected to a control unit 12, so that the heating device 1 can be controlled.

The housing 2 here has essentially a block-shaped construction, for example, with a longitudinal extent along a longitudinal side 13, wherein the sleeve 7 of the heating instrument 6 extends from the housing 2 with its end areas 10, 11 on a longitudinal-side end 14 of the housing 2. Such a construction is not shown, but it can be provided.

The housing 2 can also have an essentially block-shaped construction with a longitudinal extent along a longitudinal side 13, wherein the sleeve 7 of the heating instrument 6 extends from the housing 2 with its end areas 10, 11 on opposite longitudinal side ends 14 of the housing 2. In this way, the heating instrument extends in the longitudinal direction 13 through the housing 2.

As can be seen in the figures, the housing 2 has a multiple-part construction with a trough-shaped element 15 and with a cover element 16. The trough-shaped element 15 and the cover element 16 are connected to each other in a sealed way at a respective surrounding flange 17.

The end areas 10, 11 of the sleeve 7 are guided through openings 18 of the cover element 16 that are sealed in the area of the feed-through of the sleeve 7. For example, the sleeve 7 is soldered to the cover element 16.

A control unit 12 that is connected electrically to the at least one heating element 8 and the at least one sensor element 9 extending from the end areas 10, 11 of the sleeve 7 is set on the cover element 16. In this way, the heating output and monitoring of the heating device 1 can be controlled. Here, the control unit 12 is enclosed by a closing cover 20 that is connected in a sealed way to the cover element 16. The control unit 12 can be protected by means of the closing cover 20.

In the embodiment of FIGS. 1 to 8, the heating elements 8 are formed as wires. The sensor elements 9 can also be formed as wires.

It is also advantageous if a heating element 8 or multiple heating elements 8 are provided in a sleeve 7 of a heating instrument 6 and if a sensor element 9 or multiple sensor elements 9 are provided in the sleeve 7 of the heating instrument 6. FIGS. 1 to 8 show that three heating instruments 8 and two sensor elements 9 are provided. Alternatively, another number of heating elements 8 and sensor elements 9 could also be provided.

According to one embodiment, the heating element 8 is a heating wire that has resistance characteristics or PTC resistance characteristics.

For better stability, the heating element 8 could also be a heating wire that is surrounded by a heating element sleeve.

The sensor element 9 can also be a wire element that has PTC resistance characteristics. In this way, even for excessive heating of the heating element 8, the resistance of the sensor element 9 can be determined, so that the heating element 8 or the heating instrument can be monitored.

Here, the sensor element 9 can also be a wire element that is surrounded by a sensor element sleeve.

For the arrangement of the sensor element 9 in the sleeve 7, the sensor element 9 has two sensor element ends 21 that both emerge from the sleeve 7 of the heating instrument 6 either at the same end area 10, 11 of the sleeve 7 of a heating instrument 6 or emerge from the sleeve 7 of the heating instrument 6 at different end areas 10, 11 of the sleeve 7 of a heating instrument 6. In the first case, the sensor element 9 passes through the sleeve 7 completely; in the other case, the sensor element 9 passes through only partially with a direction change.

Figure 5:
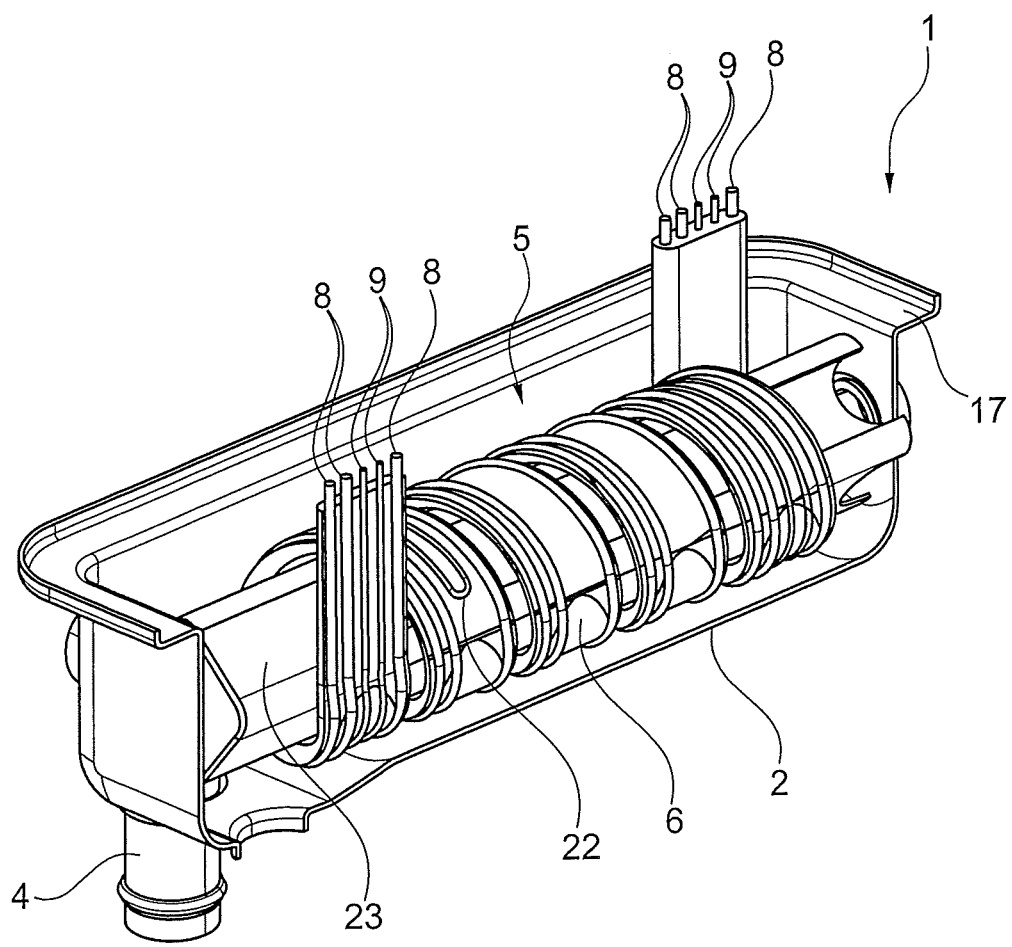
FIG. 5 is a schematic partial representation of another embodiment of an electrical heating device according to the invention.
Figures 6, 7:
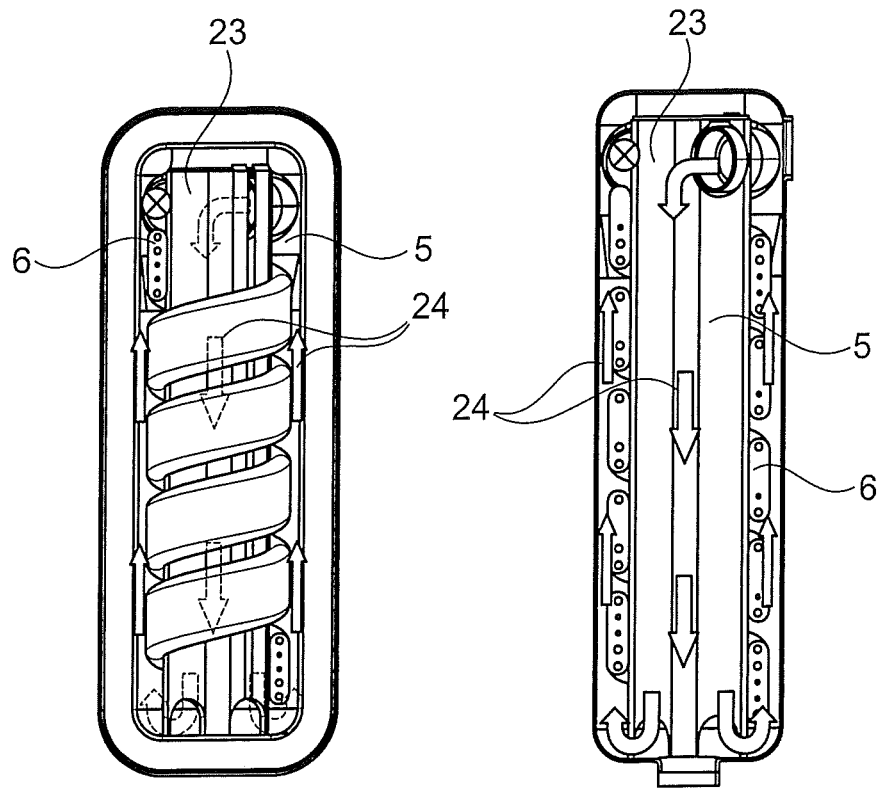
FIG. 6 is a perspective partial representation of an embodiment of an electrical heating device according to the invention.
FIG. 7 is a perspective partial representation of an embodiment of an electrical heating device according to the invention.
Figure 8:
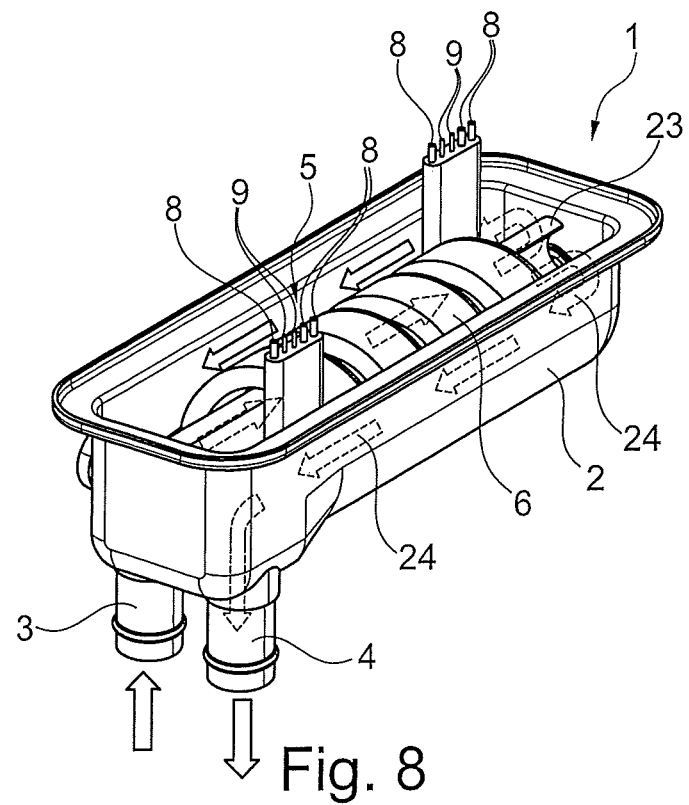
FIG. 8 is a perspective partial representation of an embodiment of an electrical heating device according to the invention.

In one embodiment it is preferred if a sensor element 9, whose sensor element ends 21 emerge from the sleeve 7 of the heating instrument 6 at the same end area 10, 11 of the sleeve 7 of a heating instrument 6, has a U-shaped profile 22 in the sleeve 7 of the heating element 8, see FIG. 5. Here, a sensor element 9 can extend only partially or completely with a U-shaped profile 22 along the longitudinal extent of the sleeve 7 of the heating instrument 6 into the sleeve 7 of the heating instrument 6.

According to FIG. 5, the arrangement of the sensor elements 9 can also be shaped so that for at least one heating instrument 6 there are multiple sensor elements 9 each of which extend a different distance into the sleeve 7 of the heating instrument 6 and/or extend from different end areas 10, 11 of the sleeve 7 of the heating instrument 6 into the heating instrument 6. This can be seen in FIG. 5.

The heating instrument 6 has a coil-shaped construction and arrangement in FIGS. 1 to 8. There is a fluid guiding element 23 in the open core of the coil of the heating instrument 6. In this way, the flowing fluid can flow in two passages through the housing 2, that is, from the fluid inlet 3 along the interior of the housing 2, where it is deflected on opposite ends 14 in order to flow back to the fluid outlet 4, see the arrows 24 of FIGS. 6, 7, and 8.

Figure 11:
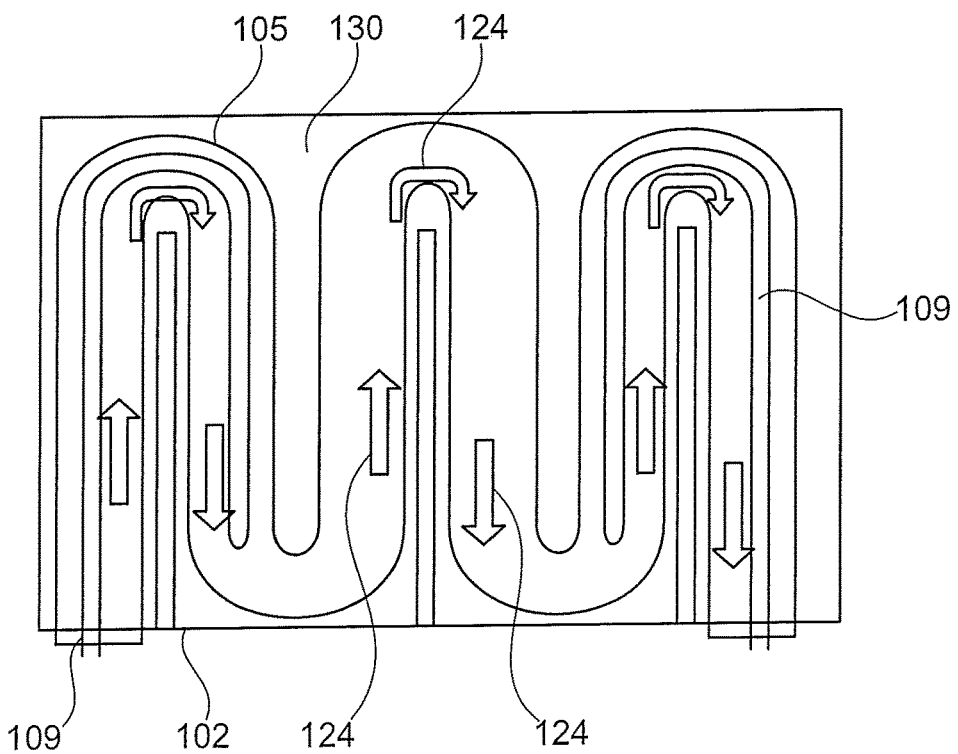
FIG. 11 is a schematic representation of a construction of a heating instrument.

As an alternative to the coil-shaped construction and arrangement of the heating instrument 6 or the heating instruments 6, the heating instrument 6 could also have a meander-shaped or differently constructed form, see, in this respect, FIG. 11. There, a meander-shaped construction of the heating instrument 105 is shown. The heating instrument 105 with two sensor elements 109 is guided in several arcs around walls 130 that are arranged transverse relative to the longitudinal direction of the housing 102. The fluid flow of the fluid to be heated is indicated by the arrows 124.

The heating instrument 105 can be arranged in a plane or can have a three-dimensional shape.

FIGS. 1 to 8 show that the heating instrument 6 has a rather flat construction and the sleeve 7 of the heating element 6 has a flat tube construction.

Figure 9:
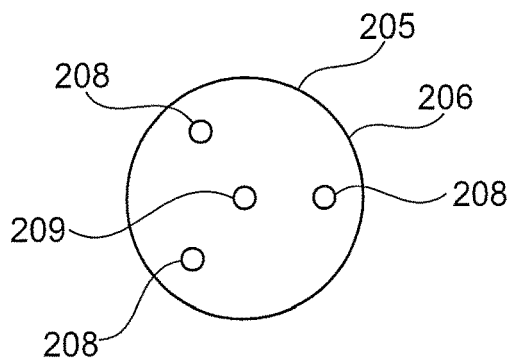
FIG. 9 is a schematic representation of an alternative heating instrument in cross section.
Figure 10:
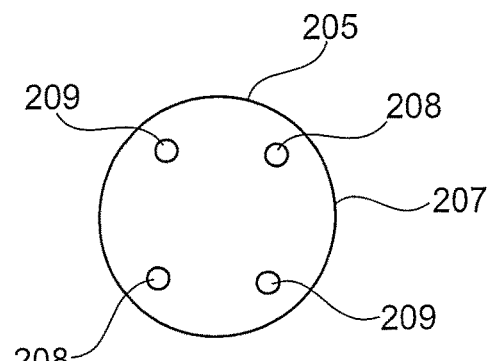
FIG. 10 is a schematic representation of an alternative heating instrument in cross section.

FIGS. 9 and 10 each show a construction in which the heating instruments 205 are constructed as heating instruments 205 with round cross sections. Here, each sleeve 207 is constructed as a round tube in which the heating elements 208 and the sensor elements 209 are arranged.

According to another concept, it is also advantageous if the heating elements 8 and/or the sensor elements 9 are provided on each of their ends 14 with crimped wires and/or pins as connection elements with a larger cross section and/or with a higher electrical conductance. In this way, the transition from heating element 8 or from sensor element 9 to the connection element can be realized in the sleeve 7 of the heating instrument 6. Thus, it is also advantageous if the transition is realized in the sleeve 7 of the heating instrument 6 at the height of the cover element of the housing 2.

In principle, elements, such as, in particular, wires that have different resistances at room temperature and/or have different cross sections and/or have different coil diameters can be used as the heating and/or sensor elements.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An electrical heating device (1) comprising a housing (2, 102) having a fluid inlet (3) for intake of a fluid to be heated into the housing (2, 102) and having a fluid outlet (4) for discharge of the fluid from the housing (2, 102), a flow channel (5) for flow of the fluid between the fluid inlet (3) and the fluid outlet (4), at least one heating instrument (6, 105, 205) extending into the flow channel (5) in the housing (2, 102), the at least one heating instrument having a sleeve (7, 207) that surrounds an interior of the at least one heating instrument (6, 105, 205) in a fluid-tight way, at least one heating element (8, 208) in the sleeve (7, 207), and at least one sensor element (9, 109, 209) in the sleeve (7, 207) for monitoring temperature of the at least one heating element (8, 208), wherein the housing (2, 102) has a multiple-part construction with a trough-shaped element (15) and a cover element (16), wherein the end areas (10, 11) of the sleeve (7, 207) are guided through openings (18) of the cover element (16) that are sealed in an area of a feed-through of the sleeve (7, 207).

2. The electrical heating device (1) according to claim 1, wherein a plurality of the at least one heating instrument (6, 105, 205) extend into the flow channel (5) in the housing (2, 102).

3. The electrical heating device (1) according to claim 1, wherein the sleeve (7, 207) of the at least one heating instrument (6, 105, 205) has a tubular construction and extends from the housing (2, 102) at its two end areas (10, 11).

4. The electrical heating device (1) according to claim 1, wherein the housing (2, 102) has an essentially block-shaped construction with a longitudinal extent along a longitudinal side (13) of the housing (2, 102), wherein the sleeve (7, 207) of the at least one heating instrument (6, 105, 205) extends from the housing (2, 102) with its end areas (10, 11) on one longitudinal end (14) of the housing (2, 102).

5. The electrical heating device (1) according to claim 1, wherein the housing (2, 102) has an essentially block-shaped construction with a longitudinal extent along a longitudinal side (13) of the housing (2, 102), wherein the sleeve (7, 207) of the at least one heating instrument (6, 105, 205) extends from the housing (2, 102) with its end areas (10, 11) each on opposite longitudinal ends (14) of the housing (2, 102).

6. The electrical heating device (1) according to claim 1, wherein a control unit (12) is located on the cover element (16), the control unit being connected electrically to the at least one heating element (8, 208) and the at least one sensor element (9, 109, 209) extending from the end areas (10, 11) of the sleeve (7, 207).

7. The electrical heating device (1) according to claim 6, wherein the control unit (12) is enclosed by a closing cover (20) that is connected to the cover element (16) in a sealed way.

8. The electrical heating device (1) according to claim 1, wherein the at least one heating element (8, 208) is provided in the sleeve (7, 207) of the at least one heating instrument (6, 105, 205) and the at least one sensor element (9, 109, 209) is provided in the sleeve (7, 207) of the at least one heating instrument (6, 105, 205).

9. The electrical heating device (1) according to claim 8, wherein the at least one heating element (8, 208) is a heating wire having resistance characteristics or PTC resistance characteristics.

10. The electrical heating device (1) according to claim 9, wherein the at least one heating element (8, 208) is a heating wire surrounded by a heating element sleeve.

11. The electrical heating device (1) according to claim 8, wherein the at least one sensor element (9, 109, 209) is a wire element having PTC resistance characteristics.

12. The electrical heating device (1) according to claim 11, wherein the at least one sensor element (9, 109, 209) is a wire element surrounded by a sensor element sleeve.

13. An electrical heating device (1) comprising a housing (2, 102) having a fluid inlet (3) for intake of a fluid to be heated into the housing (2, 102) and having a fluid outlet (4) for discharge of the fluid from the housing (2, 102), a flow channel (5) for flow of the fluid between the fluid inlet (3) and the fluid outlet (4), at least one heating instrument (6, 105, 205) extending into the flow channel (5) in the housing (2, 102), the at least one heating instrument having a sleeve (7, 207) that surrounds an interior of the at least one heating instrument (6, 105, 205) in a fluid-tight way, at least one heating element (8, 208) in the sleeve (7, 207), and at least one sensor element (9, 109, 209) in the sleeve (7, 207) for monitoring temperature of the at least one heating element (8, 208), the at least one sensor element (9, 109, 209) having two sensor element ends (21) that both emerge from the sleeve (7, 207) of the at least one heating instrument (6, 105, 205) either at a same or a different of the end areas (10, 11) of the sleeve (7, 207) of the at least one heating instrument (6, 105, 205).

14. The electrical heating device (1) according to claim 13, wherein the at least one sensor element (9, 109, 209), whose sensor element ends (21) emerge from the sleeve (7, 207) of the at least one heating instrument (6, 105, 205) at the same end area (10, 11) of the sleeve (7, 207) of the at least one heating instrument (6, 105, 205), has a U-shaped profile (22) in the sleeve (7, 207) of the at least one heating element (8, 208).

15. The electrical heating device (1) according to claim 14, wherein the at least one sensor element (9, 109, 209) having the U-shaped profile (22) extends along a longitudinal extent of the sleeve (7, 207) of the at least one heating instrument (6, 105, 205) and extends only partially or completely into the sleeve (7, 207) of the at least one heating instrument (6, 105, 205).

16. The electrical heating device (1) according to claim 15, wherein in at least one heating instrument (6, 105, 205), a plurality of the at least one sensor element (9, 109, 209) are provided, each of which extends a different amount into the sleeve (7, 207) of the at least one heating instrument (6, 105, 205) and/or extends from different of the end areas (10, 11) of the sleeve (7, 207) of the at least one heating instrument (6, 105, 205) into the at least one heating instrument (6, 105, 205).

17. The electrical heating device (1) according to claim 1, wherein the at least one heating element (6, 105, 205) has a coil-shaped or meander-shaped construction.

18. The electrical heating device (1) according to claim 1, wherein the at least one heating element (6, 105, 205) extends in a plane.

19. The electrical heating device (1) according to claim 1, wherein the at least one heating instrument (6, 105, 205) has a round or flat cross section and/or the sleeve (7, 207) of the at least one heating instrument (6, 105, 205) has a flat tube or round tube construction.

20. An electrical heating device (1) comprising a housing (2, 102) having a fluid inlet (3) for intake of a fluid to be heated into the housing (2, 102) and having a fluid outlet (4) for discharge of the fluid from the housing (2, 102), a flow channel (5) for flow of the fluid between the fluid inlet (3) and the fluid outlet (4), at least one heating instrument (6, 105, 205) extending into the flow channel (5) in the housing (2, 102), the at least one heating instrument having a sleeve (7, 207) that surrounds an interior of the at least one heating instrument (6, 105, 205) in a fluid-tight way, at least one heating element (8, 208) in the sleeve (7, 207), and at least one sensor element (9, 109, 209) in the sleeve (7, 207) for monitoring temperature of the at least one heating element (8, 208) the at least one heating element (8, 208) and/or the at least one sensor element (9, 109, 209) being provided on each of its ends (14) with crimped wires and/or pins as connection elements having a larger cross section and/or having a higher electrical conductance, wherein a transition from the at least one heating element (8, 208) or from the at least one sensor element (9, 109, 209) to the connection elements is realized in the sleeve (7, 207) of the at least one heating instrument (6, 105, 205) at a height of a cover element (16) of the housing (2, 102).

21. The electrical heating device (1) according to claim 20, wherein the at least one heating element (8, 208) and/or the at least one sensor element (9, 109, 209) comprise elements (15), optionally wires, having different resistance values at room temperature, different cross sections and/or different coil diameters.

\* \* \* \* \*